United States Patent [19]

Rahnke et al.

[11] 3,869,222

[45] Mar. 4, 1975

[54] SEAL MEANS FOR A GAS TURBINE ENGINE

[75] Inventors: Christian J. Rahnke, Roseville; James K. Vallance, Dearborn Heights, both of Mich.

[73] Assignee: Ford Motor Company, Dearborn, Mich.

[22] Filed: June 7, 1973

[21] Appl. No.: 368,003

[52] U.S. Cl. ............... 415/134, 415/138, 415/173
[51] Int. Cl. ... F01d 25/12, F01d 25/14, F01d 25/26
[58] Field of Search ........... 415/135, 138, 134, 217, 415/218, 173, 174, 110, 117; 416/172; 277/206 R; 60/39.32

[56] References Cited
UNITED STATES PATENTS

| | | | |
|---|---|---|---|
| 2,817,544 | 12/1957 | Von Der Nuell | 415/138 |
| 3,184,246 | 5/1965 | Kline | 277/206 |
| 3,295,751 | 1/1967 | Sceggel | 415/218 |
| 3,520,635 | 7/1970 | Killmann | 415/138 |
| 3,758,123 | 9/1973 | Ksieski | 277/206 |

FOREIGN PATENTS OR APPLICATIONS

| | | | |
|---|---|---|---|
| 589,919 | 6/1925 | France | 415/136 |

*Primary Examiner*—William L. Freeh
*Assistant Examiner*—L. J. Casaregola
*Attorney, Agent, or Firm*—Roger E. Erickson; Keith L. Zerschling

[57] ABSTRACT

A pressure seal for separating elements of a gas turbine engine shroud assembly. The seal accommodates for differing rates and magnitudes of thermal expansion and is not significantly affected by eccentricities of out-of-roundness between the shroud elements. The seal is annular and has a generally Y-shaped cross section. The bifurcated or divergent elements of the seal are clamped within the base without welding.

5 Claims, 4 Drawing Figures

PATENTED MAR 4 1975          3,869,222
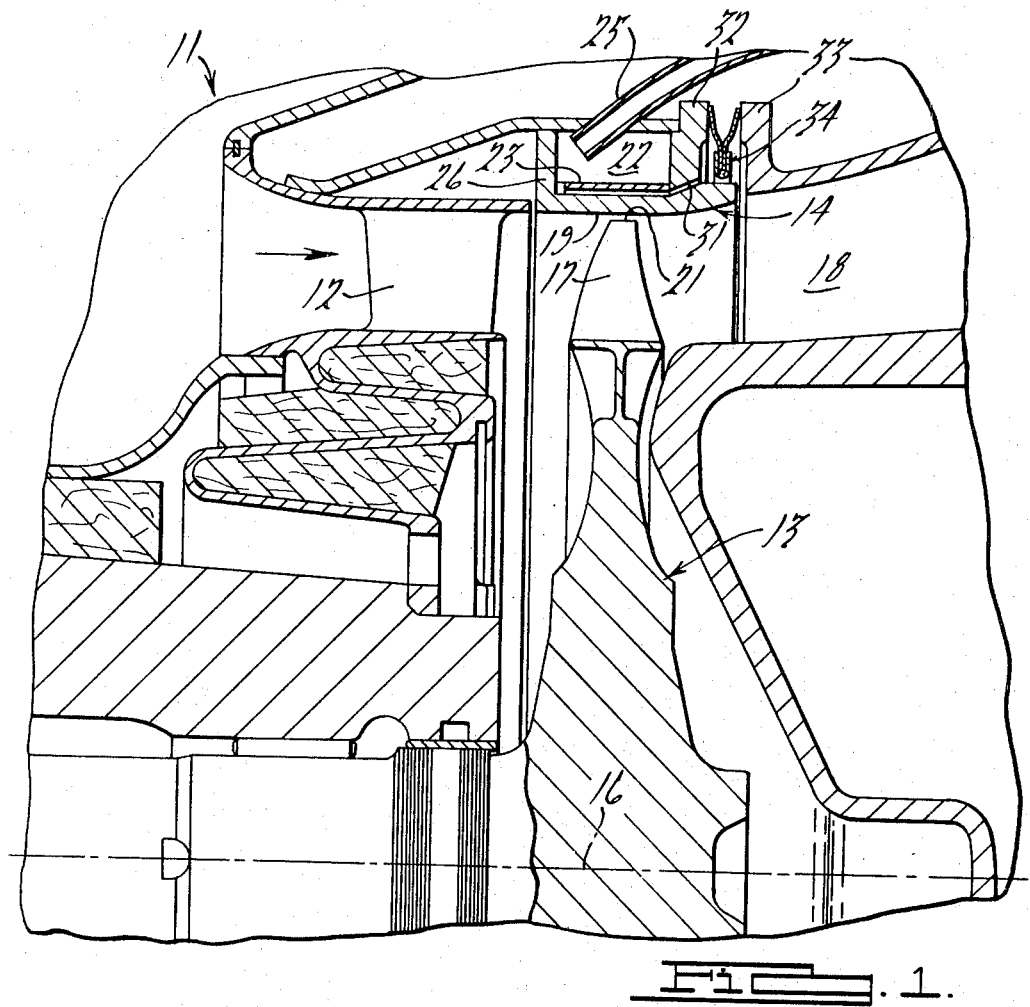
FIG. 1.
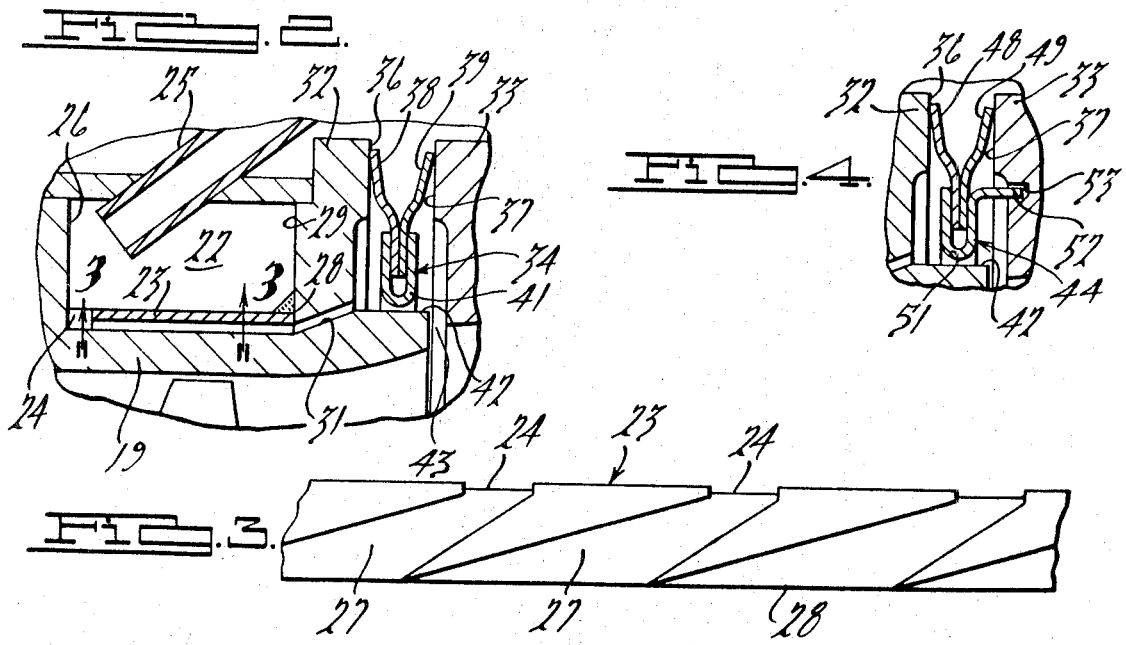
FIG. 2.   FIG. 4.
FIG. 3.

SEAL MEANS FOR A GAS TURBINE ENGINE

BACKGROUND AND SUMMARY OF THE INVENTION

Gas turbine engines, particularly those of the regenerative type, operate at very high temperatures. For this reason, means to accommodate for differing rates and magnitudes of thermal expansion between elements of the turbine engine are necessary. Such means commonly take the form of annular seals which separate volumes having differing pressures. In known engines, seal effectiveness is often reduced by eccentricities between the sealing surfaces or conditions of out-of-roundness in one or more of the sealing surfaces.

This invention provides a pressure seal for a gas turbine engine which accommodates for changes in clearance between the sealing surfaces. Furthermore, this invention provided sealing means which is essentially unaffected by eccentricities and conditions of out-of-roundness among the annular elements. This invention also provides sealing means in which the seals are formed between parallel surfaces. Still further, this invention provides sealing means in which the seal is intensified by differential pressure. The invention also provides a seal construction which the separate elements of the seal assembly are joined without welding. Finally, it is an object of this invention to provide sealing means economical to produce and reliable in operation.

A gas turbine engine constructed in accordance with this invention includes shroud means including annular elements concentric with the axis of rotation of the turbine rotor and axially spaced to provide clearance for thermal expansion. Annular seal means are positioned within the axial separations between the annular shroud elements and includes a pair of resiliently deformable fingers that are axially compressed between the axially spaced shroud elements.

BRIEF DESCRIPTION OF THE DRAWINGS

FIG. 1 is a cross sectional view through the axis of a gas turbine engine portion.

FIG. 2 is an enlarged portion of FIG. 1.

FIG. 3 is an elevational view of an uninstalled element of the gas turbine engine along line 3—3 of FIG. 2.

FIG. 4 is a cross sectional view of an alternate embodiment of the seal.

DETAILED DESCRIPTION OF THE PREFERRED EMBODIMENT

Reference numeral 11 refers to a portion of a gas turbine engine including a nozzle assembly 12, a compressor or gasifier rotor 13 and a shroud assembly 14. The nozzle 12 is at an angle relative to the axis 16 of the rotor and directs a stream of hot gases against the rotor blades 17, such that the momentum of the gases transmits force to the blades causing the rotor to turn about axis 16. The gas passes through passage 18 where it impinges on the power turbine rotor (not shown). The shroud assembly 14 includes a wall portion 19 that encircles the compressor rotor at a predetermined clearance from the tips 21 of the rotor fin. The shroud structure including wall 19 defines a generally annular chamber 22. A plurality of tubes 25 introduce air into the chamber 22 from the centrifugal compressor discharge area (not shown). At the compressor discharge, the air is at approximately a temperature of 400°F and a pressure of 60 p.s.i.

Circumscribing the shroud wall 19 and received within the annular chamber 22 is a ring or annular band 23. The forward edge of the band is provided with a plurality of evenly spaced inlet recesses 24 providing intermittent spaces between the sidewall 26 of the chamber and the band. From each of the side recesses extends a groove 27 formed in the radial inner surface of the band and traversing the band at an angle. The grooves increase in width from the inlet side of the band to the outlet side. The grooves are preferably of a depth of 0.008 inch but may be of a range from 0.005 to 0.020 inch. The grooves may be formed in the band by electrochemical etching. The band is welded in place about the wall portion 19 of the shroud assembly. The weld is preferably at the rearward, radially outer edge 28 of the band and applied so as to form a seal between the edge 28 and sidewall 29 of the shroud assembly. A number of passages 31 connect the outlets of the grooves with the space between shroud segments 32 and 33. This space experiences a pressure of about 30 p.s.i. at normal operating speeds. Consequently, a pressure differential of approximately 30 p.s.i. exists across grooves 27 resulting in substantial air flow through the grooves against the radially outer surface of the shroud wall portion 19. This movement of air across the shroud surface through grooves of approximately eight-thousandths of an inch in depth results in a sweeping of the shroud wall surface so that the normal boundary layer of air against the wall which acts as an insulator to reduce cooling is disturbed or continually swept away thereby reducing the boundary layer insulating effect and carrying away heated air from the shroud wall. The air flow from passages 31 passes beneath seal member 34 into the combustion flow through passage 18.

The expansion seal assembly 34 is positioned between shroud segments 32 and 33 to accommodate for differing rates or magnitudes of thermal expansion. The shroud components 32 and 33 include annular surfaces 36 and 37, respectively, which are perpendicular to the axis 16. The seal has a generally Y-shaped cross section including a pair of divergent annular leaves 38 and 39 having edges resiliently bearing against the surfaces 36 and 37, respectively. The leaves are clamped between an annular base 41 having a U-shaped cross section. The inside diameter of the seal assembly 34 is greater than the outer diameter of the outer portion 42 of the shroud so that the seal assembly fits loosely about the shroud and permits passage of cooling air from within chamber 22 past the base of the seal assembly, through the clearance space 43 in the shroud and then joined with the combustion gases of the turbine. The regenerator pressure of approximately 60 p.s.i. acts on the radially outer surfaces of the seal assembly, while the combustion passage pressure, typically 30 p.s.i., acts on the base. It, thus, may be seen that pressure differential enhances the sealing between leaves 38 and 39 and the surfaces 36 and 37, respectively.

An alternate embodiment of the seal is shown in FIG. 4 of the drawings. The seal assembly 44 includes divergent annular leaves 48 and 49 corresponding in shape and function to leaves 38 and 39 of the previously described embodiment. The base 51 has a U-shaped portion but includes an axially extending cylindrical flange 52 extending into a circular groove 44 formed in shroud segment 33. The flange 51 acts to locate the seal 44 relative to the shroud assembly 33 and surface 42 and, further, functions to prevent warping or twisting which may result from certain types of thermal expansion and contraction.

Modifications and alterations will occur to those skilled in the art which are included within the scope of the following claims.

What is claimed is:

1. In a gas turbine engine having turbine rotor means constructed to rotate about a given axis,
    annular shroud means surrounding said rotor means,
    said shroud means including generally annular elements being axially separated to accommodate for thermal expansion of said elements,
    annular seal means positioned within the axial separations between said elements,
    said seal means having a pair of resiliently deformable fingers axially compressed between said elements,
    said seal means having a generally Y-shaped cross section,
    said seal separating volumes of said engine having differing pressures,
    the top of "Y" being exposed to the higher pressure whereby the pressure differential increases the sealing.

2. A gas turbine engine according to claim 1,
    said shroud annular elements having parallel surfaces perpendicular to said axis engaging said seal means.

3. A gas turbine engine according to claim 2,
    said seal means having an annular base,
    a pair of divergent annular leaves extending radially outwardly from said base and resiliently engaging said parallel surfaces.

4. In a gas turbine engine having turbine rotor means constructed to rotate about a given axis,
    annular shroud means surrounding said rotor means,
    said shroud means including generally annular elements being axially separated to accommodate for thermal expansion of said elements,
    said shroud annular elements having parallel surfaces perpendicular to said axis engaging said seal means,
    annular seal means positioned within the axial separations between said elements,
    said seal means including an annular base having generally a U-shaped cross section,
    a pair of divergent annular leaves extending radially outwardly from said base and resiliently engaging said parallel surfaces,
    the radially inner portions of said divergent annular leaves being clamped within said annular base.

5. A gas turbine engine according to claim 4,
    said annular base having a generally axially extending flange portion,
    a circular groove formed in one of said parallel surfaces of said shroud annular elements receiving the axially extending flange portion to limit the displacement of said seal means in a plane substantially perpendicular to said given axis.

* * * * *